(12) United States Patent
Stiebitz et al.

(10) Patent No.: US 8,955,417 B2
(45) Date of Patent: Feb. 17, 2015

(54) ROTARY DRIVE DESIGN

(75) Inventors: Guenter Stiebitz, Waldenburg (DE);
Patrick Roll, Schwaebisch Hall (DE);
Joachim Glattbach, Pfedelba (DE)

(73) Assignee: SWG Schraubenwerk Gaisbach GmbH, Waldenburg (DE)

( * ) Notice: Subject to any disclaimer, the term of this patent is extended or adjusted under 35 U.S.C. 154(b) by 0 days.

(21) Appl. No.: 13/501,154

(22) PCT Filed: Jun. 3, 2011

(86) PCT No.: PCT/EP2011/059180
§ 371 (c)(1),
(2), (4) Date: Apr. 10, 2012

(87) PCT Pub. No.: WO2011/151435
PCT Pub. Date: Dec. 8, 2011

(65) Prior Publication Data
US 2013/0068075 A1    Mar. 21, 2013

(30) Foreign Application Priority Data

Jun. 4, 2010 (DE) .......................... 10 2010 029 692

(51) Int. Cl.
*B25B 15/00* (2006.01)
*F16B 23/00* (2006.01)
*B25B 13/06* (2006.01)

(52) U.S. Cl.
CPC ............ *B25B 13/065* (2013.01); *F16B 23/003* (2013.01); *B25B 15/005* (2013.01)
USPC ........................................... 81/460; 411/403

(58) Field of Classification Search
CPC ...... B25B 15/00; B25B 15/02; B25B 15/005; B25B 13/065; F16B 23/003; Y10S 411/919
USPC ............ 81/460; 411/402, 407, 408, 403, 404
See application file for complete search history.

(56) References Cited

U.S. PATENT DOCUMENTS

| 3,584,667 | A |   | 6/1971 | Reiland |
|-----------|---|---|--------|---------|
| 5,019,080 | A | * | 5/1991 | Hemer .......................... 606/104 |
| 5,207,132 | A |   | 5/1993 | Goss et al. |
| 5,219,253 | A |   | 6/1993 | Shinjo |
| 5,435,680 | A | * | 7/1995 | Schuster ....................... 411/404 |
| 5,509,334 | A | * | 4/1996 | Shinjo ............................ 81/460 |
| 5,553,983 | A |   | 9/1996 | Shinjo |

(Continued)

FOREIGN PATENT DOCUMENTS

| DE | 102004022852 A1 | 9/2005 |
| EP | 0 524 617 A1 | 1/1993 |

(Continued)

*Primary Examiner* — David B Thomas
(74) *Attorney, Agent, or Firm* — Boyle Fredrickson, S.C.

(57) ABSTRACT

A design for a rotary drive both for a tool and for a workpiece to be rotationally driven is proposed. This rotary drive design contains a cylindrical basic shape which deviates from a circular cylindrical shape. The contour or the cross section through this basic shape has a plurality of rounded projections and rounded recesses arranged between said projections. The projections tangentially touch a circle having a maximum radius, while the recesses, for their part, tangentially touch a circle having a minimum radius. Deviating from this cylindrical basic shape, in the regions between the projections are configured conical surfaces, which are not instrumental in the transmission of torques, but take care of centering and alignment between the tool and the workpiece.

22 Claims, 3 Drawing Sheets

(56) References Cited

U.S. PATENT DOCUMENTS

| | | | |
|---|---|---|---|
| 6,626,067 B1* | 9/2003 | Iwinski et al. | 81/121.1 |
| 2009/0010734 A1* | 1/2009 | Lin | 411/413 |
| 2011/0217143 A1* | 9/2011 | Hughes et al. | 411/407 |
| 2012/0137842 A1* | 6/2012 | Guo et al. | 81/460 |

FOREIGN PATENT DOCUMENTS

| | | |
|---|---|---|
| JP | 2004197908 A | 7/2004 |
| WO | 2006/023374 A1 | 3/2006 |

\* cited by examiner

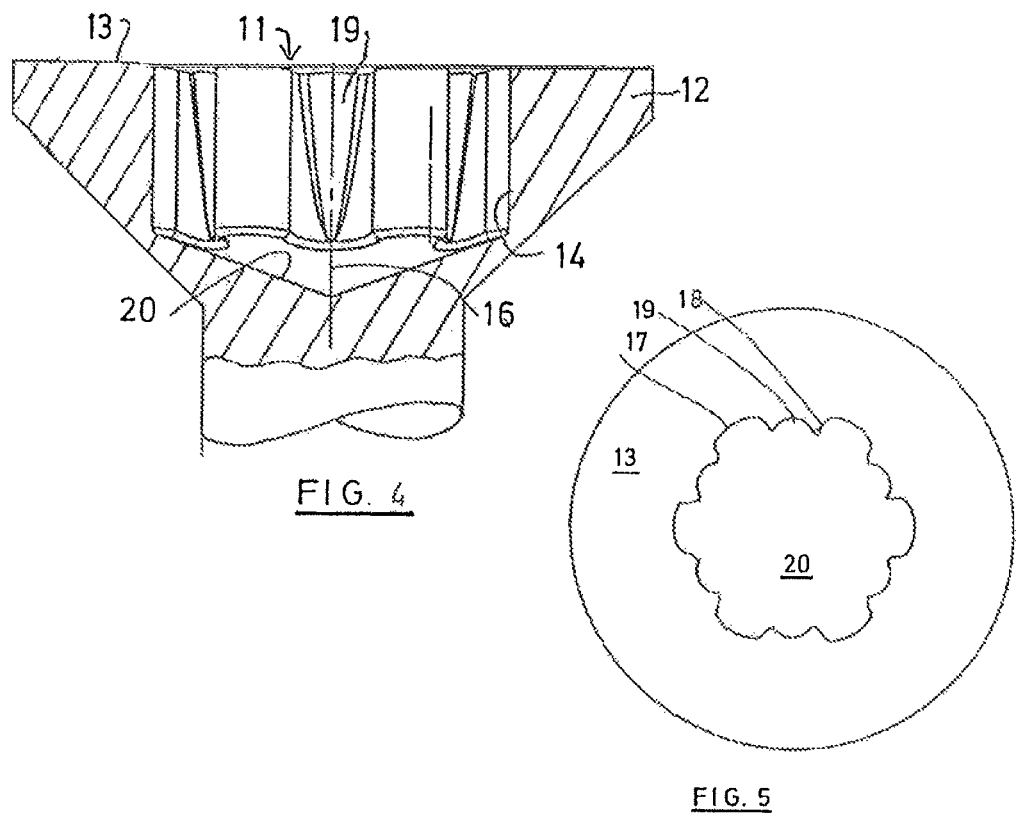
FIG. 4
FIG. 5
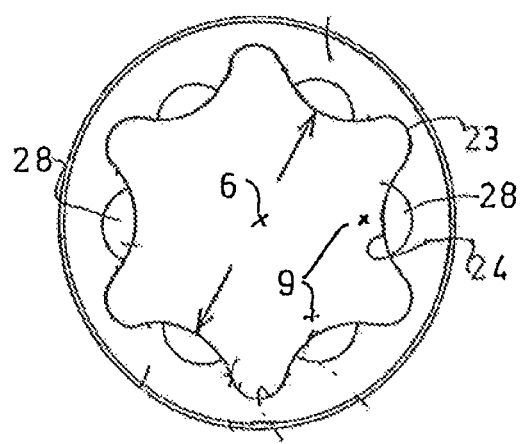
FIG. 6

ROTARY DRIVE DESIGN

CROSS REFERENCE TO RELATED APPLICATION

None

BACKGROUND OF THE INVENTION

The invention relates to a rotary drive design by means of which a rotary motion of a tool can be transmitted to a workpiece.

Rotary drive designs which contain an at least approximately cylindrical cavity, or a like projection, the shape of which deviates from a circular cylindrical shape, are known in connection with screws.

In a known screw head design (U.S. Pat. No. 3,584,667), the outer periphery of the cylindrical recess or of the cylindrical projection is formed from alternately inwardly and outwardly directed circular arcs which merge tangentially into one another, the inwardly directed circular arcs having double the diameter of the outwardly directed circular arcs.

In further known drive system having a cylindrical cavity, the cross section of the cavity has outwardly directed lobes and flutes arranged between the lobes. The shape of the lobes and flutes is elliptical. A better force transmission is intended to thus be achieved (U.S. Pat. No. 5,207,132).

Owing to the cylindrical basic shape of the drive design both in the screw and on the tool, and owing to the required manufacturing tolerances, there is always a gap between the torque-transmitting surface of the tool and the torque-receiving surface of the workpiece. This gap leads to the tool, during the rotary drive, being subjected to forces running transversely to the rotational axis, which forces can lead to a disparity between the rotational axis of the tool and the rotational axis of the workpiece.

SUMMARY OF THE INVENTION

In order to tackle this problem, a rotary drive design has already been proposed in which the side wall has conical surfaces between its cylindrical parts, all conical surfaces being parts of the surface of a single cone whose axis coincides with the axis of the cavity or the drive projection (EP 524617). A centering of the tool in relation to the workpiece is thereby realized, so that the axes of workpiece and tool remain in mutual extension.

The object of the invention is to provide a rotary drive design which is capable of transmitting higher torques, given otherwise equal dimensions.

For the achievement of this object, the invention proposes a rotary drive design and a rotary drive design. Refinements of the invention are the subject of subclaims.

The rotary drive design, in the case of a drive cavity, is again composed of two geometric structures, namely a cylindrical basic shape whose contour constantly varies between a minimum radius and a maximum radius, starting from a center axis, so that projections and recesses are alternately formed. In the prior art, these are in part referred to as lobes and flutes. To this cylindrical basic shape are then added conical surfaces, at which, therefore, deviation is made from the cylindrical shape. These conical surfaces serve for centering purposes. In contrast to the prior art, not all conical surfaces lie on a common cone, however, but rather each conical surface lies on a cone of its own. The axis of this cone does not coincide with the center axis of the cavity, nor, in the case of a drive projection, with the center axis of the drive projection.

The projections and recesses are usually configured such that they are mutually identical. All projections have the same shape, and also all recesses have the same shape. A point symmetry of the cross section is thereby obtained.

The conical surfaces lie in a region between the maximum and minimum diameter of the drive cavity or of the drive projection.

As a result of the radially outward displacement of the axis of each cone of each, conical surface, the surface occupied by the conical surface becomes smaller than in the prior art, so that the surfaces which serve for the torque transmission become larger.

In a refinement of the invention, it, can be provided that the respective conical surface is configured between the projections of the basic shape.

In a further refinement of the invention, it can be provided that the axial extent of the conical surface roughly corresponds to the depth of the drive cavity or the height of the drive projection. Hence, despite the reduction in size of the surface of the conical surface, a sufficiently large centering surface for the centering operation is nevertheless enabled.

It has already been mentioned that the cone axis of the conical surfaces, is outwardly offset from the center axis of the cavity or the drive projection. In particular, it can be provided that the axis is outwardly offset by more than half the minimum radius. It can be provided, for example, that the distance of the axis of the conical surface from the axis of the drive cavity or the drive projection is greater than the distance of the axis of the conical surface from the recess of the side wall.

In particular, in one refinement it can be provided that the axis of the conical surfaces divides the distance of the recess from the axis of the drive cavity or of the drive projection in the ratio of at least about 1 to 3, preferably 1 to 5.

In a further refinement of the invention, it can be provided that the width of each conical surface decreases in the direction of the tip of the associated cone, preferably down to zero.

The conical surfaces which are arranged between the projections can he constituted by parts of circular cones.

It is likewise possible however, and is proposed by the invention, that said projections are constituted by parts of elliptical cones or oval cones. In the case of the cones of non-circular cross section, it is provided, in particular, that the longer dimension of the cross section runs tangentially to the rotary drive design.

The invention proposes to configure a rotary drive design, of the kind herein described, on an object which is to be rotationally driven, for example a screw. However, a rotary drive design, can also be provided on other objects which are to be rotationally driven and in which the transmission of high torques, and low play, is of material importance.

The invention likewise proposes arranging a rotary drive design, as herein described, on a tool. In this context, a screwdriver or a screwdriver bit is primarily envisioned, but also a wrench.

Screws which have a rotary drive design according to the invention can also be screwed with tools which do not conform to the invention, but without the specific advantages of the invention.

BRIEF DESCRIPTION OF THE DRAWINGS

Further features, details and advantages of the invention emerge from the claims and the abstract, the wording of both of which is formulated by reference to the content of the description, the following description of preferred embodiments of the invention, and on the basis of the drawing, wherein:

FIG. 4 shows an axial section through a screw head according to the invention;

FIG. 5 shows the top view of the screw head of FIG. 4;

FIG. 6 shows a representation, corresponding to FIG. 3, of a drive projection having a changed cross-sectional shape;

DETAILED DESCRIPTION OF THE PREFERRED EMBODIMENT

Figure 1:
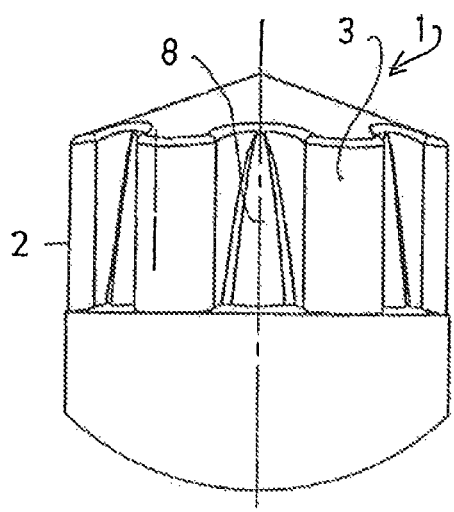
FIG. 1 shows the side view of a rotary drive design in the form of a drive projection.

The first three figures show different views of a drive projection 1 having a rotary drive design according to the invention. This can be constituted either by the drive end of a bolt or by the end of a screwdriver bit. This rotary drive design has a side wall 2, which has a basic shape comprising a cylindrical shell surface. The contour of this shell surface, which can best be seen in the top view of FIG. 3, has projections 3 and recesses 4. The Projections 3 and recesses 4 merge flush and without edges into one another. Overall, the contour of the side wall or of the shell surface of the side wall forms a closed curve, the projections 3 and recesses 4 having mutually the same shape. If a circle is drawn such that it, touches all the projections 3 on their outer side, then this circle, and thus the maximum radial extent of the projections 3, has a radius 5 from the center point of the drive projection 1. This radius is the maximum radius of the side wall from the center axis 6. It is hereinafter referred to as the maximum radius.

A circle can likewise be drawn around the center axis 6, which circle touches the inner sides of the recesses 4. This circle then has a smaller radius 7, which will be hereinafter referred to as the minimum radius The contour of the side wall 2 of the drive projection 1 thus varies between these two values.

Between the projections 3, a bulge forming an outer conical surface 8 can now respectively be seen.

These conical surfaces 8 are arranged midway between the projections 3. Their maximum radial extent is found at that end of the rotary drive design which is opposite to the free end of the drive projection 1. The maximum radial extent, as can be seen from all the figures, does not reach to the maximum radius 5. The tip of the cone of each conical surface 8 should be envisioned in the direction of the free end of the drive projection 1. The width of the conical surfaces 8 is such that it decreases from that end of the rotary drive design which is facing away from the free end of the drive projection 1 to the free end of the drive projection 1, and ends in a point at the, in FIGS. 1 and 2, upper end.

All conical surfaces 8 are equally large. The imaginary cone axis of each conical surface 8 is offset in relation to the center axis 6 in rotary drive design, to be precise in the direction of the conical surface 8. For example, the imaginary cone axis 9 lies beyond half the distance of the inner side of the recess 4 from the center axis 6 of the rotary drive design.

Figure 2:
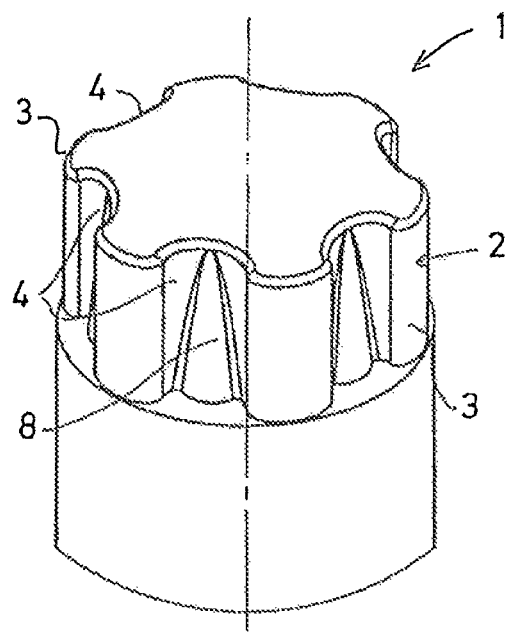
FIG. 2 shows the perspective view of the drive projection of the FIG. 1.
Figure 3:
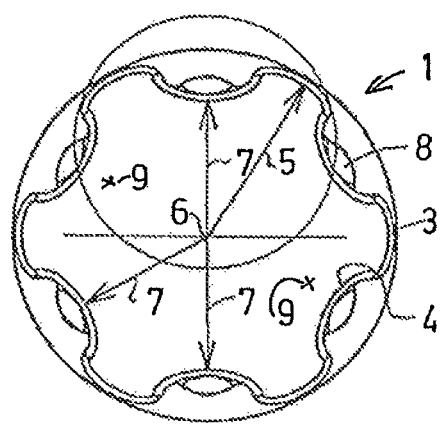
FIG. 3 shows the top view of the drive projection of FIG. 1 above.

In that embodiment of a rotary drive design which is represented in FIGS. 1 to 3, in the form of a drive projection 1, the projections 3 and recesses 4, in the top view of FIG. 3, run along elliptical curves. In the represented illustrative embodiment, the conical surfaces 8 are constituted by circular conical surfaces. It can be seen from the figures, in particular from FIG. 3, that, as a result of the stronger curvature of the conical surfaces 8, a greater part of the side wall remains in the cylindrical region and is thus available for the transmission of torques between a tool having this rotary drive design and a workpiece having a complementary rotary drive design.

While FIG. 1 shows a side view of a drive projection 1, FIG. 4 now shows the example of a drive cavity 11 in the head 12 of a countersunk screw. The shape of the drive cavity 11 is complementary to the shape of the drive projection.

The drive cavity 11 starts from the end face 13 of the head 12. The drive cavity contains a side wall 14, the basic shape of which is cylindrical, i.e. runs parallel to the center axis 16 of the cavity. As can be seen from FIG. 5, the contour of the side wall 14 has the same shape as the contour of the side wall 2 of the drive projection 1 in FIG. 3. The contour thus contains projections 17 and, between these, recesses 18. Roughly midway between respectively two projections 17 is configured a conical surface 19, which is part of a cone having a tip directed into the interior in the direction of the floor 20 of the drive cavity 11.

It has already been mentioned that the contour of the rotary drive design, both in the embodiment of FIG. 1 to FIG. 3 and in the embodiment according to FIG. 4 and FIG. 5, is formed from elliptical arcs which merge into one another. The invention is not however limited to a specific type of course of the contour, but can also find application if the contour follows a different course. This is illustrated in simplified representation on the basis of the example of FIG. 6. The contour here consists of mutually adjoining arcs of circular shape, with the outwardly directed projections 23 and the recesses 24 having a different radius. The radius of the recesses 24 is twice as large as the radius of the projections 23. Here too, conical surfaces 28 are configured between the projects 23 in the middle of the recesses 24 on the outer side, which conical surfaces, in side view, look exactly the same as in the embodiment according to FIG. 1 and FIG. 2.

In the previously discussed embodiments, the conical surfaces 8, 19, 28 are parts of the surfaces of right circular cones. The following embodiments, represented in FIGS. 7 to 11, use conical Surfaces 38, 39 which are part of a cone of elliptical or oval cross section.

Figures 7, 8:
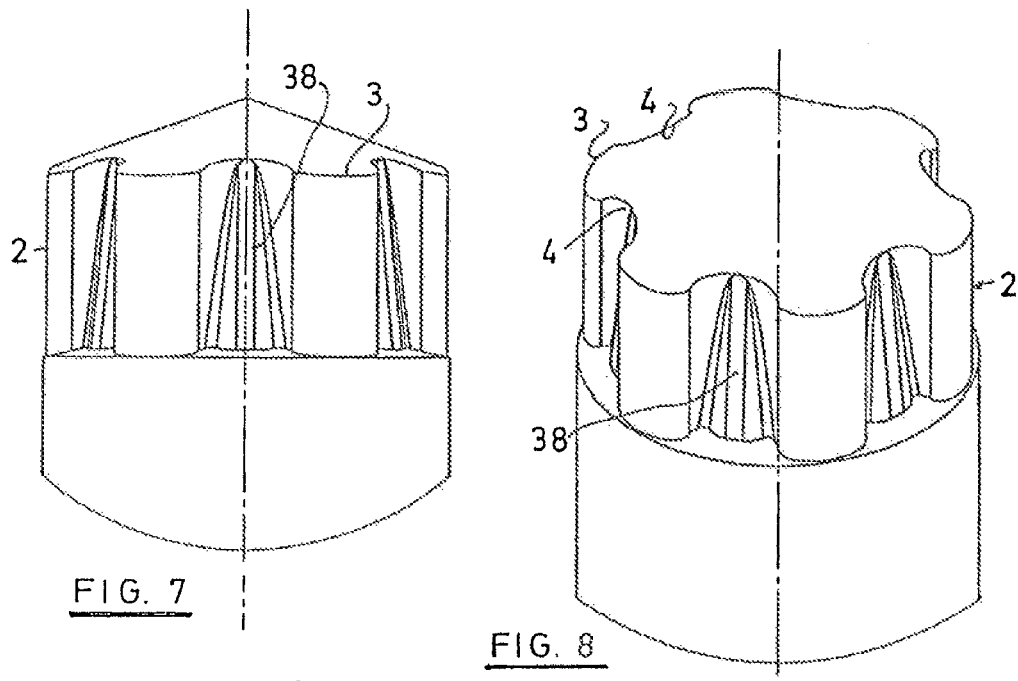
FIG. 7 shows a side view, corresponding to FIG. 1, in respect of a second embodiment.
FIG. 8 shows the perspective view of the drive projection of FIG. 7.
Figures 9, 10:
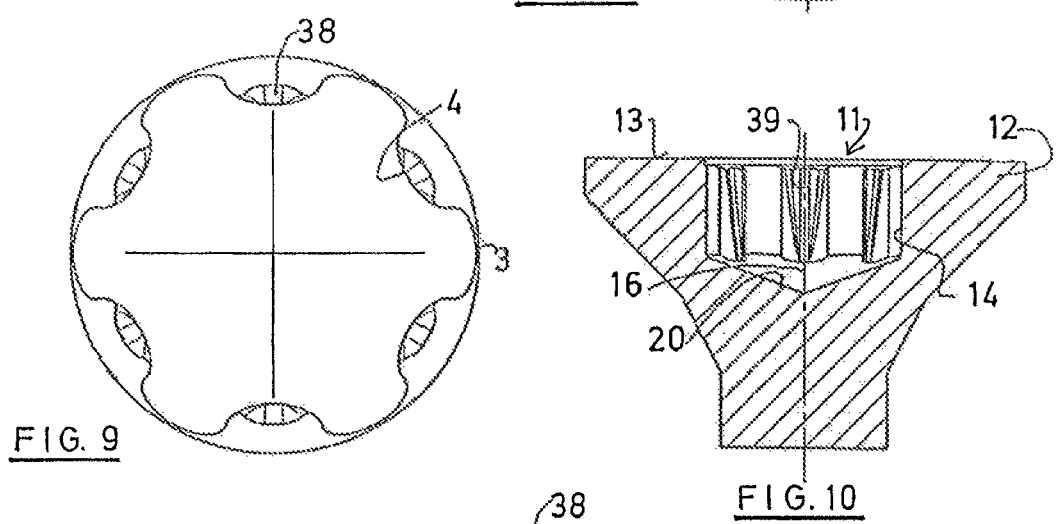
FIG. 9 shows the top view of the drive projection of FIG. 7 above.
FIG. 10 shows an, axial section through a screw head of the embodiment according to FIG. 7 to FIG. 9.

FIGS. 7-9 correspond to FIGS. 1-3, so that only the differences are described. As can best be seen in FIG. 9, the conical surfaces 38 between the projections 3 are parts of cone surfaces of elliptical cross section. As a result, they appear in the peripheral direction more elongated than the circular conical surfaces of the previous embodiment. This applies both to the conical surfaces 38 on the outer side of a drive projection and to the conical surfaces 39 on the inner side of a drive cavity 11 in the screw head 12. FIG. 10.

Figure 11:
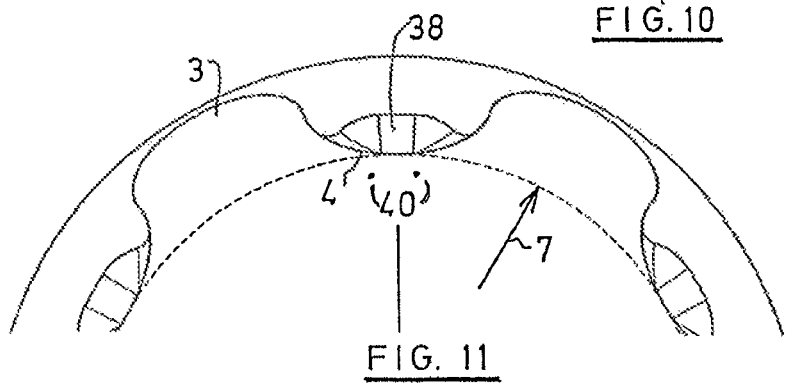
FIG. 11 shows an enlarged part-representation of FIG. 9.

FIG. 11 shows an enlarged representation, namely a detail from FIG. 9. The two foci 40 of the elliptical basic shape of the conical surfaces 38 lie roughly in that region of the circle which has the minimum radius 7. The longer dimension of the cross section of the cone to which the conical surfaces 38 belong runs tangentially or, in other words, in the peripheral direction of the rotary drive design.

In that embodiment, too, in which the conical surfaces 38, 39 are cone surfaces of cones of oval or elliptical cross section, the projections 3 or recesses 4 of the outer contour can have different shapes than represented in FIG. 7 to FIG. 11. In this regard, reference is made to the embodiment according to FIG. 6.

The invention claimed is:

1. A rotary drive having:
    a drive cavity defined by a side wall, the side wall being intended for contact with a counter element during the rotary drive having a substantially cylindrical basic shape,
    wherein a distance of the side wall from a center axis of the drive cavity varies between a minimum radius and a maximum radius for formation of alternating projections and recesses, and
    wherein the side wall is situated in a region lying in a radial direction between the maximum and minimum diameter of the drive cavity, on a respective conical surface of a respective cone tapering into an interior of the drive cavity,
    a cone axis of which cone is outwardly offset in the radial direction in relation to the axis of the drive cavity, the cone axis of which cone is outwardly offset in the radial direction in relation to the axis of the drive cavity.

2. The rotary drive as claimed in claim 1, wherein the conical surface is configured between the projections of the basic shape.

3. The rotary drive as claimed in claim 1, wherein the axial extent of the conical surface roughly corresponds to the depth of the drive cavity or the height of the drive projection.

4. The rotary drive as claimed in claim 1, wherein the distance of the axis of the conical surface from the center axis of the drive cavity is greater than the distance of the axis of the conical surface from the recess.

5. The rotary drive as claimed in claim 4, wherein the axis of the conical surface divides the distance of the recess from the center axis of the drive cavity or of the drive projection in a ratio of about 1 to 5.

6. The rotary drive as claimed in claim 1, wherein a width of each conical surface decreases in the direction of a tip of the cone, preferably down to zero.

7. The rotary drive as claimed in claim 1, wherein the at least one conical surface is part of a right circular cone.

8. The rotary drive as claimed in claim 1, wherein at least one conical surface is part of an elliptical or oval cone, in which a longer axis of a cross section runs tangentially to the rotary drive.

9. The rotary drive as claimed in claim 1, configured on an object which is to be rotationally driven, in particular a screw.

10. The rotary drive as claimed in claim 1, configured on a tool, in particular a screwdriver or a screwdriver bit.

11. The rotary drive as claimed in claim 10, configured on a wrench.

12. A rotary drive in a form of a drive projection, having
    a side wall intended for contact with a counter element during a rotary drive action that has a substantially cylindrical basic shape,
    wherein the distance of the side wall from a center axis of the drive projection varies between a minimum radius and a maximum radius for formation of alternating projections and recesses, and
    wherein the side wall is situated in a region lying in a radial direction between the maximum and minimum diameter of the drive projection, on a respective conical surface of a respective cone tapering, in the direction of the end of the drive projection, a cone axis of which cone is outwardly offset in the radial direction in relation to the center axis of the drive projection.

13. The rotary drive as claimed in claim 12, wherein the conical surface is configured between the projections of the basic shape.

14. The rotary drive as claimed in claim 12, wherein an axial extent of the conical surface roughly corresponds to a height of the drive projection.

15. The rotary drive as claimed in claim 12, wherein the distance of the axis of the conical surface from the center axis of the drive projection is greater than the distance of the axis of the conical surface from the recess.

16. The rotary drive as claimed in claim 15, wherein the axis of the conical surface divides the distance of the recess from the center axis of the drive projection in a ratio of about 1 to 5.

17. The rotary drive as claimed in claim 12, wherein a width of each conical surface decreases in the direction of a tip of the cone, preferably down to zero.

18. The rotary drive as claimed in claim 12, wherein the at least one conical surface is part of a right circular cone.

19. The rotary drive as claimed in claim 12, wherein at least one conical surface is part of an elliptical or oval cone, in which a longer axis of the cross section runs tangentially to the rotary drive.

20. The rotary drive as claimed in claim 12, configured on an object which is to be rotationally driven, in particular a screw.

21. The rotary drive as claimed in claim 12, configured on a tool, in particular a screwdriver or a screwdriver bit.

22. The rotary drive as claimed in claim 21, configured on a wrench.

* * * * *